United States Patent
Ekpenyong et al.

(10) Patent No.: US 10,158,393 B2
(45) Date of Patent: *Dec. 18, 2018

(54) DYNAMIC RECONFIGURATION OF UPLINK TRANSMISSION IN A TDD WIRELESS COMMUNICATION SYSTEM

(71) Applicant: TEXAS INSTRUMENTS INCORPORATED, Dallas, TX (US)

(72) Inventors: Anthony Edet Ekpenyong, Houston, TX (US); Ralf Matthias Bendlin, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/621,905

(22) Filed: Jun. 13, 2017

(65) Prior Publication Data

US 2017/0288725 A1 Oct. 5, 2017

Related U.S. Application Data

(63) Continuation of application No. 14/268,697, filed on May 2, 2014, now Pat. No. 9,680,522.

(Continued)

(51) Int. Cl.
*H04B 1/56* (2006.01)
*H04W 72/04* (2009.01)
(Continued)

(52) U.S. Cl.
CPC .......... *H04B 1/56* (2013.01); *H04W 72/0446* (2013.01); *H04L 5/0073* (2013.01); *H04L 5/0091* (2013.01); *H04L 5/1469* (2013.01)

(58) Field of Classification Search
CPC ......... H04B 1/56; H04L 5/00; H04W 72/0446
See application file for complete search history.

(56) References Cited

U.S. PATENT DOCUMENTS 9,680,522 B2 * 6/2017 Ekpenyong .............. H04B 1/56
2012/0317652 A1 12/2012 Kiley et al.
(Continued)

FOREIGN PATENT DOCUMENTS

CN 102958058 A 3/2013
CN 103037524 A 4/2013
(Continued)

OTHER PUBLICATIONS

3GPP TS 22.011 V11.2.0 (Dec. 2011) 3rd Generation Partnership Project; Technical Specification Group Services and System Aspects; Service Accessibility (Release 11) [online], Dec. 2011 [retrieved on Oct. 15, 2014]. Retrieved from the Internet:<URL:http://www.qtc.jp/3GPP/Specs22011-b20.pdf>.
(Continued)

*Primary Examiner* — Andrew Lai
*Assistant Examiner* — Chuong M Nguyen
(74) *Attorney, Agent, or Firm* — Gregory J. Albin; Charles A. Brill; Frank D. Cimino (57) ABSTRACT

Embodiments of the invention use signaling mechanisms that enable dynamic reconfiguration of the UL/DL resource partitioning by user equipment (UE) in a TDD wireless communication system, such as the 3GPP TDD Long Term Evolution (TD-LTE) system. The dynamic reconfiguration of the UL/DL resource partitioning disclosed herein may also be applied to any other TDD wireless system employing dynamic reconfiguration of the TDD UL/DL configuration.

22 Claims, 6 Drawing Sheets

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 MS | D | S | U | U | U | D | S | U | U | U |
| 1 | 5 MS | D | S | U | U | D | D | S | U | U | D |
| 2 | 5 MS | D | S | U | D | D | D | S | U | D | D |
| 3 | 10 MS | D | S | U | U | U | D | D | D | D | D |
| 4 | 10 MS | D | S | U | U | D | D | D | D | D | D |
| 5 | 10 MS | D | S | U | D | D | D | D | D | D | D |
| 6 | 5 MS | D | S | U | U | U | D | S | U | U | D |

Related U.S. Application Data (60) Provisional application No. 61/821,415, filed on May 9, 2013.

(51) Int. Cl.
  *H04L 5/00* (2006.01)
  *H04L 5/14* (2006.01)

(56) References Cited

U.S. PATENT DOCUMENTS

| | | | |
|---|---|---|---|
| 2013/0051288 A1 | 2/2013 | Yamada et al. | |
| 2013/0083719 A1* | 4/2013 | Seo | H04L 5/0057 370/312 |
| 2014/0004867 A1* | 1/2014 | Noh | H04W 76/023 455/450 |
| 2014/0119261 A1* | 5/2014 | Wang | H04W 72/04 370/312 |
| 2015/0003351 A1* | 1/2015 | Park | H04J 1/02 370/329 |

FOREIGN PATENT DOCUMENTS

| | | |
|---|---|---|
| WO | 2010146781 | 12/2010 |
| WO | WO2012109195 A2 | 8/2012 |
| WO | WO2012121574 A2 | 9/2012 |
| WO | WO2012167431 A1 | 12/2012 |
| WO | 2013002572 | 1/2013 |
| WO | 2013022244 | 2/2013 |
| WO | 2013170426 | 11/2013 |

OTHER PUBLICATIONS

3GPP TSG RAN WG2 Meeting #80, "Consideration on TDD Configuration Change", R2-125533, Agenda Item 7.5, New Orleans, USA, Nov. 12-16, 2012.

3GPP TSG RAN WG1 Meeting #72, "Discussion on the Signalling Mechanisms for TDD UL-DL Reconfiguration", R1-130261, Agenda Item 7.3.3.3, St. Julian's, Malta, Jan. 28-Feb. 1, 2013.

3GPP TSG RAN WG1 Meeting #72, "Signaling Mechanisms for Reconfiguration", R1-130587, Agenda Item 7.3.3.3, St. Julian's, Malta, Jan. 28-Feb. 1, 2013.

3GPP TSG RAN WG1 Meeting #72, "Backward Compatibility and Potential Reconfiguration Gain for Legacy UE", R1-130654, Agenda Item 7.3.3.4, St. Julian's, Malta, Jan. 28-Feb. 1, 2013.

3GPP TSG RAN WG1 Meeting #72, "Signalling Methods for TDD UL/DL Reconfiguration with Different Time Scales", R1-130701, Agenda Item 7.3.3.3, St. Julian's, Malta, Jan. 28-Feb. 1, 2013.

3GPP TSG RAN WG1 Meeting #72bis, "Signaling Mechanisms for TDD eIMTA", R1-130883, Agenda Item 7.2.3.2, Chicago, USA, Apr. 15-19, 2013.

3GPP TSG RAN WG1 Meeting #72bis, "Interference Issues for Supporting Backward Compatibility in TDD eIMTA Systems", R1-131204, Agenda Item 7.2.3.1, Chicago, USA, Apr. 15-19, 2013.

3GPP TSG RAN WG1 Meeting #72bis, "Discussion on Signalling Support for the Indication of Dynamic TDD UL/DL Reconfiguration", R1-131223, Agenda Item 7.2.3.2, Chicago, USA, Apr. 15-19, 2013.

First Office Action and Search Report in Chinese Patent Application No. 201480026134.9 dated Aug. 18, 2017, 20 pages.

3GPP TSG RAN WG1 #72bis, R1-131502, Texas Instruments, "Signaling Mechanisms for Adaptive TDD UL/DL Reconfiguration", Chicago, IL, US, Apr. 15-19, 2013, 4 pages.

3GPP TSG-RAN WG1 #72bis, R1-131629, Qualcomm Incorporated, "Signaling Mechanisms for Reconfiguration". Chicago, IL, USA, Apr. 16, 2013, 5 pages.

* cited by examiner

FIG. 1

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 MS | D | S | U | U | U | D | S | U | U | U |
| 1 | 5 MS | D | S | U | U | D | D | S | U | U | D |
| 2 | 5 MS | D | S | U | D | D | D | S | U | D | D |
| 3 | 10 MS | D | S | U | U | U | D | D | D | D | D |
| 4 | 10 MS | D | S | U | U | D | D | D | D | D | D |
| 5 | 10 MS | D | S | U | D | D | D | D | D | D | D |
| 6 | 5 MS | D | S | U | U | U | D | S | U | U | D |

FIG. 6

DYNAMIC RECONFIGURATION OF UPLINK TRANSMISSION IN A TDD WIRELESS COMMUNICATION SYSTEM

CROSS-REFERENCE TO RELATED APPLICATIONS

This application is a continuation of application Ser. No. 14/268,697, filed May 2, 2014, which claims the benefit U.S. Provisional Application No. 61/821,415, filed May 9, 2013, titled "Dynamic Reconfiguration of Uplink Transmission in a TDD Wireless Communication System" the disclosure of which is hereby incorporated by reference herein in its entirety.

TECHNICAL FIELD

The technical field of this invention is wireless communication such as wireless telephony.

BACKGROUND

Time Division Duplex (TDD) wireless communication systems transmit and receive data on a single carrier frequency. Uplink (UL) and downlink (DL) transmissions are multiplexed by time slots within a fixed time interval. Different UL/DL ratios may be selected depending upon the degree of asymmetry in the DL and UL traffic rates. For a traditional homogeneous deployment of macro cells, the traffic patterns are relatively semi-static and the TDD UL/DL configuration, which defines the UL/DL time allocation, may remain unchanged for time intervals of at least hundreds of milliseconds or seconds. However, it has been observed that in heterogeneous deployment scenarios, such as networks consisting of small cells with or without a macro cell overlay, the UL and DL traffic patterns are more dynamic in nature. As such, system capacity may be significantly increased by adaptively reconfiguring the TDD UL/DL configuration in response to fast changes in UL and DL traffic patterns.

Another feature of traditional TDD systems is that cells within a geographical area may be configured with the same UL/DL configuration to avoid inter-cell UL-to-DL and DL-to-UL interference. When inter-cell UL-to-DL interference occurs, a UL transmission in one cell interferes with DL reception in a neighboring cell. When inter-cell DL-to-UL interference occurs, the DL transmission in one cell interferes with the UL reception in a different cell. Such inter-cell interference may occur both when the neighboring cells are operating on the same carrier frequency and when they are operating on different but adjacent carrier frequencies. If the UL/DL configuration in one cell is adaptively reconfigured based on intra-cell traffic patterns, then this change may cause severe co-channel and even adjacent channel interference to neighboring cells.

SUMMARY

Embodiments of the invention use signaling mechanisms that enable dynamic reconfiguration of the UL/DL resource partitioning by a base station for user equipment (UE) in a TDD wireless communication system, such as the 3GPP TDD Long Term Evolution (TD-LTE) system. The dynamic reconfiguration of the UL/DL resource partitioning disclosed herein may also be applied to any other TDD wireless system employing dynamic reconfiguration of the TDD UL/DL configuration.

BRIEF DESCRIPTION OF THE DRAWINGS

These and other aspects of this invention are illustrated in the drawings, in which.

DETAILED DESCRIPTION

The invention(s) will now be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

Figure 1:
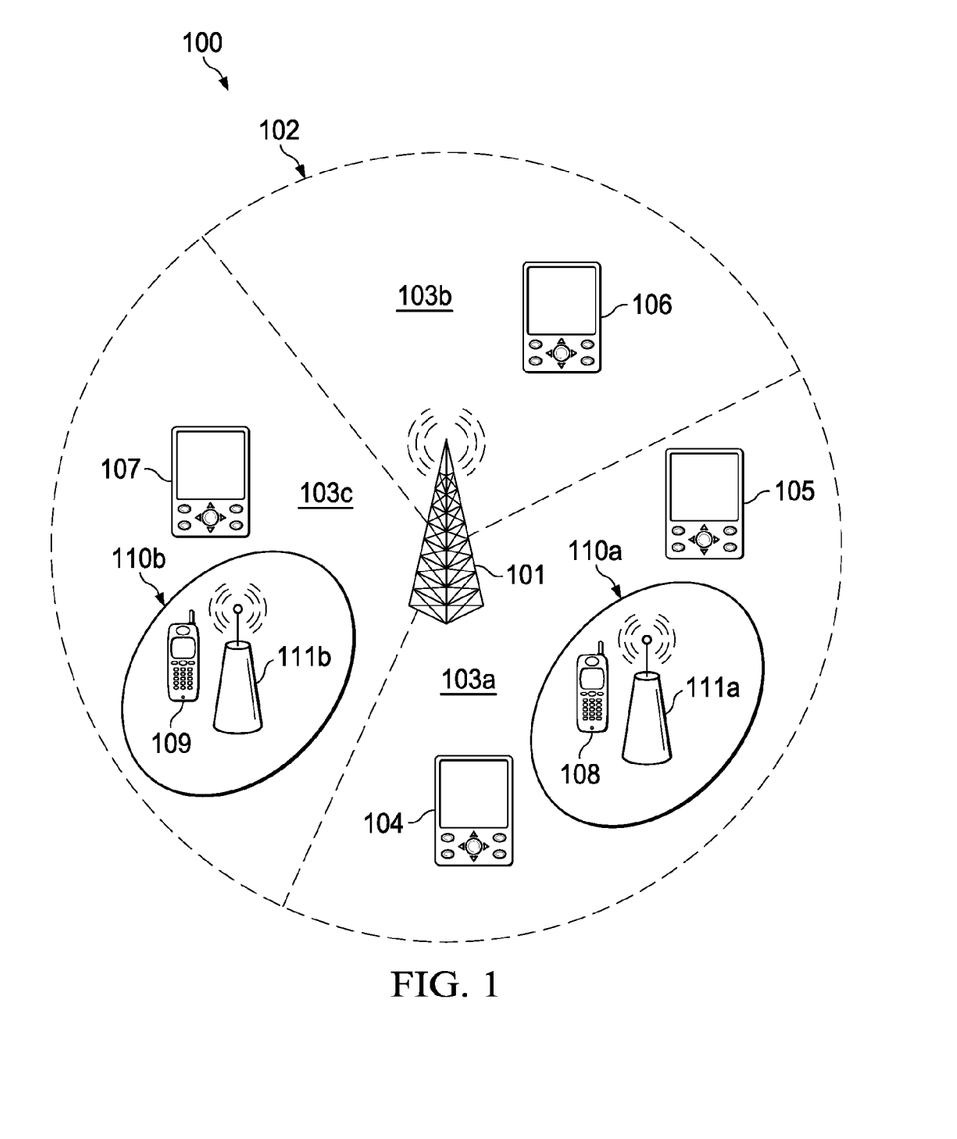
FIG. 1 is a block diagram of a TDD wireless system, such as a TD-LTE system, that may employ dynamic reconfiguration of the UL/DL resource partitioning according to one embodiment.

FIG. 1 is a block diagram of a TDD wireless system 100, such as a TD-LTE system, that may employ dynamic reconfiguration of the UL/DL resource partitioning according to one embodiment. Base station 101, such as an evolved NodeB (eNB) in an LTE system, serves macro cell coverage area 102, which is further divided into cells 103a-c. It will be understood that a telecommunications network necessarily includes many more macro base stations, but only one is illustrated here to simplify the description. A TDD wireless system may also contain small cells such as micro- or pico-cells 110a/b, which are controlled by low power base stations 111a/b. User equipment (UE) 104-109, such as mobile telephone handsets, receive DL transmissions from base station 101 and 111a/b and send UL transmissions to base station 101 and/or base stations 111a/b. The UEs may include current devices 108-109 which comply with a current standard or protocol version (e.g., LTE Release 12), while other, legacy devices 104-107 may comply with an older version of the standard or protocol (e.g., LTE Release 8/9 or 10). Each base station 101, 111a/b may signal the cell-specific UL/DL configuration to be used by the UEs deployed in a cell under its control using the broadcast information in System Information Block Type 1. In the embodiment illustrated in FIG. 1, dynamic TDD may be configured for user equipment served by base stations 111a/b.

Figure 2:
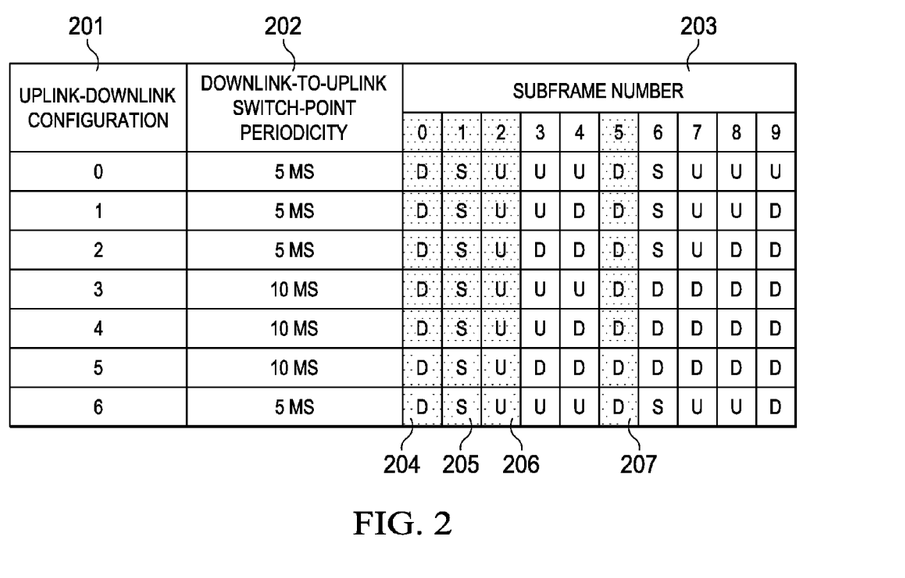
FIG. 2 is a table illustrating different TDD UL/DL configurations that can be used in an LTE system according to one embodiment.

FIG. 2 is a table illustrating different TDD UL/DL configurations that can be used in an LTE system according to one embodiment. Column 201 numbers seven (0-6) different UL/DL configurations. Column 202 identifies the DL-to-UL switch-point periodicity for each UL/DL configuration. Column 203 identifies the subframe types for each configuration. For each subframe in a radio frame, "D" denotes subframes that are reserved for downlink transmissions, "U" denotes subframe that are reserved for uplink transmissions, and "S" denotes special subframes. The special subframes have three fields: Downlink Pilot Time Slot (DwPTS), guard period (GP), and Uplink Pilot Time Slot (UpPTS). The DwPTS portion may be used for downlink data transmission, while the UpPTS portion may be used for sounding the uplink channel or for transmitting random access preambles. The GP portion of a special subframe allows switching between DL reception to UL transmission as well as coexistence with other TDD systems, such as Time Division-Synchronous Code Division Multiple Access (TD-SCDMA). Shaded columns 204-207 indicate that the same subframe type is present in that subframe for each of the UL/DL configurations. These are referred to herein as fixed subframes since the communication direction does not change across all possible UL/DL configurations. The fixed subframes include subframes 0, 1, 2 and 5.

Base stations 101 and 111*a/b* inform the UEs of the cell-specific TDD UL/DL configuration using information broadcast in System Information Block Type 1 (SIB1). To avoid UL-to-DL and DL-to-UL inter-cell interference, the same UL/DL configuration may be assigned to each cell 103*a-c* and 110*a/b* operating on the same or on adjacent carrier frequencies.

If a UE is capable of adaptive TDD reconfiguration, then the UE also signals adaptive TDD capabilities to the serving base station 101, 111*a/b*. The adaptive TDD capability signaling from the UEs includes the case where adaptive TDD capability is mandatory for all TDD-capable UEs of a certain LTE release. In the embodiment illustrated in FIG. 1 base station 111*a* may choose to configure a specific UE by dedicated Radio Resource Control (RRC) signaling for dynamic reconfiguration of the TDD UL/DL configuration. Hence, for each adaptive TDD capable UE the cell-specific UL/DL configuration can be dynamically reconfigured to a UE-specific UL/DL configuration that is different from the UL/DL configuration broadcasted in the SIB1. Moreover, the base station may configure the same UL/DL configuration for a group of UEs in one cell.

Those UEs that are not configured for or are not capable of adaptive TDD operation use the UL/DL configuration signaled in SIB1. Therefore, to maintain backward compatibility it is desired that DL subframes in which legacy UEs expect cell-specific reference signals (CRS) should not be reconfigured to UL subframes. This restriction on the configurability of DL subframes applies to cells operating with LTE transmission formats that require CRS to be present in DL subframes and also in the DwPTS portion of the special subframes. An evolved transmission format may also be introduced for a future LTE release, where CRS is not present in a subset of DL subframes, including the case of all DL subframes. This evolved transmission format is also known as a New Carrier Type and is not backward compatible, i.e., it is not supported by UEs of an earlier LTE release. Since some or all DL subframes in a cell operating with the evolved transmission format do not contain CRS it is possible to reconfigure these DL subframes to UL subframes. The set of subframes for which the transmission direction can be dynamically reconfigured are known as flexible subframes.

Dynamic variation of the UL/DL configuration affects semi-statically configured UL transmission parameters for Sounding Reference Signal (SRS), Channel State Information (CSI), HARQ-ACK feedback and preamble transmission on the Physical Random Access Channel (PRACH).

The following issues must be addressed in a system employing dynamic UL/DL reconfiguration:
- The actual time when the dynamic UL/DL reconfiguration becomes active must be unambiguous to both the base station and UE.
- For SRS transmissions, a change from an UL subframe to a DL subframe affects the definition of cell-specific and UE-specific SRS subframes.
- For CSI reporting in semi-statically configured subframes, the base station scheduler may determine its actual reporting configuration based upon the UL/DL configuration signaled in SIB1.
- PRACH resources should be carefully configured to avoid UL-to-DL interference when a SIB1-configured UL resource containing PRACH resources is dynamically reconfigured for DL.

In one embodiment, the TDD UL/DL reconfiguration command for a UE may be dynamically signaled in a Downlink Control Information (DCI) format carried in a Physical Downlink Control Channel (PDCCH) or an Enhanced Physical Downlink Control Channel (EPDCCH). Alternatively, the reconfiguration command can be contained in a Medium Access Channel (MAC) control element that is scheduled by a PDCCH or EPDCCH. In either case a three-bit field in the control information payload may be used to indicate which of the seven TDD UL/DL configurations should be used by the UE in a next time period.

Signaling UL/DL Reconfiguration.

Figure 3:
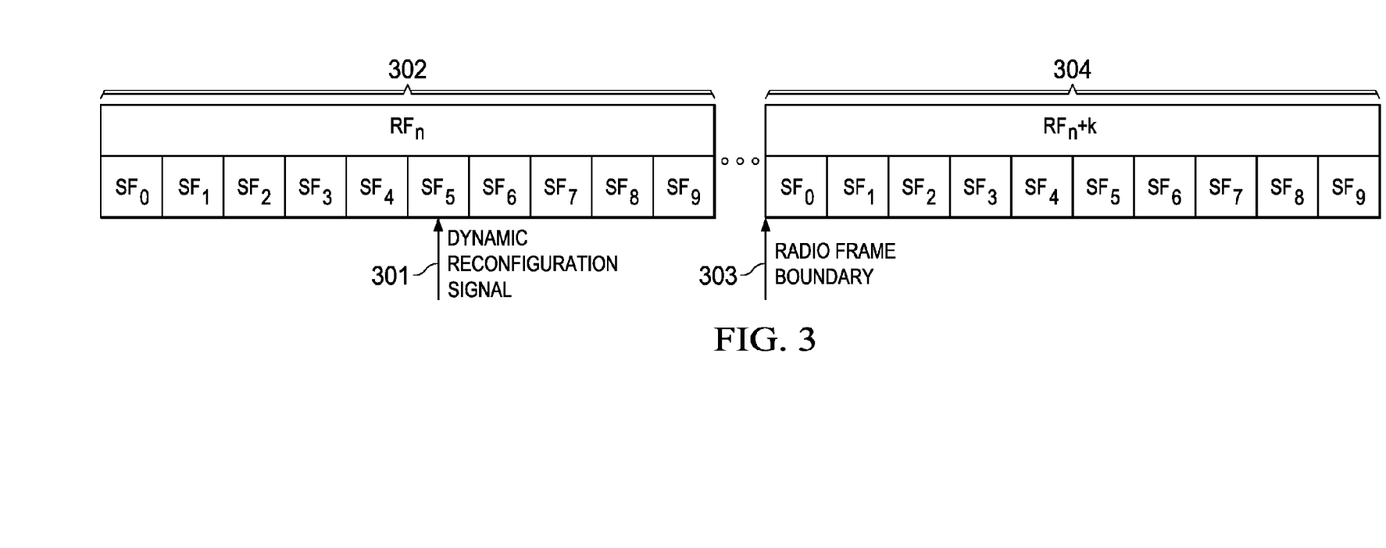
FIG. 3 illustrates reception of the UL/DL reconfiguration signal and the activation time according to one embodiment.

A UE is configured by RRC signaling for dynamic reconfiguration of the TDD UL/DL configuration. FIG. 3 illustrates reception of the UL/DL reconfiguration signaling and the activation time definition according to one embodiment. Each dynamically signaled UL/DL configuration is assumed to be valid for at least one radio frame. Each radio frame includes ten subframes $SF_m$. The UL/DL reconfiguration takes place at a radio frame boundary (i.e., after all of the subframes for a radio frame are complete). Since subframes 0 ($SF_0$) and 5 ($SF_5$) are fixed DL subframes, the UE monitors at least subframes 0 and/or 5 for a PDCCH/EPDCCH indicating (or scheduling the indication of) an UL/DL reconfiguration.

For example, if dynamic reconfiguration signaling 301 is detected in radio frame n ($RF_n$) 302, the new UL/DL configuration becomes active at radio frame boundary 303 of subsequent radio frame n+k ($RF_{n+k}$) 304. For example, k may be 1 for the fastest reconfiguration interval (i.e., reconfigure the very next radio frame) or k may be 4 for a 40 ms reconfiguration interval. It will be understood that any other values of k may also be used to designate the interval before UL/DL reconfiguration occurs.

More generally, UL/DL reconfiguration may follow a change notification window, wherein any reconfiguration signal that is detected within the current change notification window indicates that the signaled UL/DL reconfiguration shall take effect at the next notification window boundary. A notification window boundary may be defined as the boundary of a radio frame for which the modulus operation on two integers, one being the System Frame Number (SFN) of that radio frame and one being the modification period, returns zero.

In another embodiment, if dedicated PHY signaling is used in an LTE system, then the reconfiguration signaling can be transmitted in a DCI format. A DCI format with a small payload can be used to transmit the UL/DL reconfiguration command because it allows usage of a low rate error control code for reliable reception at the UE. In one embodiment the payload size of DCI format 1A can be re-used to reconfigure the TDD UL/DL configuration. Other small payload DCI formats are not precluded such as DCI format 1C.

In a first adaptive UL/DL reconfiguration scheme, the UE monitors DCI format 1A with the Cyclic Redundancy Check (CRC) scrambled by the Cell Radio Network Temporary Identifier (C-RNTI) for a dynamic UL/DL reconfiguration. A one-bit field is designated in DCI format 1A to distinguish between Physical Downlink Shared Channel (PDSCH) scheduling and TDD UL/DL reconfiguration. For example, if the designated bit value is "0", then the detected DCI format 1A schedules PDSCH; however, if the bit value is "1", the detected DCI format 1A indicates a UL/DL reconfiguration.

If the designated bit value is "1", at least the following bit fields are defined for signaling:
the new UL/DL configuration (three bits required);
optional fields indicating changes to SRS transmission and CSI reporting configurations according to the new UL/DL configuration; and
all the remaining bits in format 1A for compact scheduling assignment of one PDSCH codeword are set to zero.

In a second adaptive UL/DL reconfiguration scheme, a new DCI format is defined for signaling TDD UL/DL reconfiguration. The new DCI format includes:
the CRC of the reconfiguration DCI payload scrambled with the C-RNTI; alternatively, a different RNTI can be used to scramble the CRC of the reconfiguration DCI payload.
a 3-bit field indicating the new UL/DL configuration; and
optional bit fields indicating changes to the SRS transmission and CSI reporting configurations according to the new UL/DL configuration.

The UE monitors the UL/DL reconfiguration DCI format only in subframes 0 and/or 5 of radio frames within a change notification window.

SRS Transmission

For SRS transmission, a UE is semi-statically configured by RRC signaling for periodic and/or aperiodic sounding with dedicated parameters, such as an SRS periodicity $T_{SRS}$ and SRS subframe offset $T_{offset}$. Since sounding is semi-statically configured, it may happen that the sounding subframe according to a cell-specific TDD UL/DL configuration signaled in SIB1 is now a DL subframe after dynamic reconfiguration. Therefore, a new mechanism is required to support SRS transmission for adaptive reconfiguration of the TDD UL/DL configuration. The following example methods enable sounding for adaptive TDD UL/DL configuration.

In a first scheme, the TDD reconfiguration command contains an SRS delta offset field ($\Delta_{offset}$). This field is used to adjust the SRS subframe offset such that the SRS is sounded on a valid UL subframe in the dynamically signaled TDD UL/DL configuration. After adaptive reconfiguration, the SRS subframe offset is given by $T_{offset\_dynamic}=(T_{offset}+\Delta_{offset})$ mod X, where $T_{offset}$ is the semi-statically configured SRS subframe offset, X is a parameter that determines the number of bits in the SRS delta offset field, and $T_{offset\_dynamic}$ is the dynamically reconfigured SRS subframe offset. The SRS delta offset applies for whatever sounding (i.e., periodic and/or aperiodic) is configured for the UE.

In an example case, TDD UL/DL configuration 0 is signaled in SIB1. Then, a UE that is capable of adaptive TDD reconfiguration is semi-statically configured for aperiodic sounding with $T_{SRS}=10$ and $T_{offset}=9$. In a radio frame n, the UL/DL configuration is dynamically reconfigured to TDD UL/DL configuration 1, wherein subframe 9 is now a DL subframe. The SRS offset field is set to $\Delta_{offset}=9$ and X=10. Therefore, $T_{offset\_dynamic}=8$, which is a valid UL subframe for UL/DL configuration 1.

It may be observed in the previous example that a four-bit field is needed for the SRS offset field to account for $\Delta_{offset}$ in the range $\{0, 1, 2, \ldots, 9\}$ (i.e., for ten subframe choices). Alternatively, by noting that subframes 0 and 5 are always DL subframes, the range can be reduced by removing these fixed DL subframes so that a 3-bit $\Delta_{offset}$ field would be sufficient (i.e., for eight subframe choices where $\Delta_{offset}$ may represent the modified range $\{1, 2, 3, 4, 6, 7, 8, 9\}$). In this case, the range of $\Delta_{offset}$ depends on the dynamically signaled UL/DL configuration with respect to the SIB1-configured UL/DL configuration.

If the reconfiguration command is signaled in a common DCI format or common MAC control element for a group of UEs, the SRS delta offset field may apply to all UEs configured for sounding.

In a second scheme, a UE is configured to transmit SRS according to a periodic SRS configuration in a subframe m where subframe m is an UL subframe according to the SIB1-signaled UL/DL configuration, but following a dynamic reconfiguration of the TDD UL/DL configuration, subframe m becomes a DL subframe. Accordingly, the UE shall not transmit SRS because subframe m is no longer a UL subframe. Alternatively, if the UE is configured for aperiodic SRS transmission and scheduled to transmit aperiodic SRS in subframe m of a radio frame but subframe m becomes a DL subframe following a dynamic reconfiguration of the TDD UL/DL configuration then the UE disregards the aperiodic SRS request and does not transmit SRS in subframe m, which is no longer an UL subframe.

In a third scheme, a UE detects a PDCCH in radio frame n. The PDCCH contains a positive SRS request that schedules SRS transmission for subframe m of radio frame n+k, where k≥1. If the TDD UL/DL configuration is changed for radio frame n+k such that subframe m in radio frame n+k is no longer a valid cell-specific SRS subframe, then the UE transmits the aperiodic SRS in the first valid cell-specific SRS subframe following subframe m in radio frame n+k. Alternatively, the UE may transmit the aperiodic SRS in the first valid UE-specific aperiodic SRS subframe following subframe m in radio frame n+k.

It is possible to reconfigure an UL subframe to a DL subframe in an LTE system and not affect legacy operation. This may be achieved, for example, by not scheduling Physical Uplink Shared Channel (PUSCH), Physical Uplink Control Channel (PUCCH), SRS or PRACH for these subframes. However, since the SRS configuration is semi-statically configured for the UE by RRC signaling, dynamic reconfiguration of a cell-specific SRS subframe to a DL subframe may cause UL-to-DL interference. As a result, a UE that is not configured for dynamic TDD UL/DL reconfiguration may transmit SRS and cause interference to another UE receiving in the DL. The following interference avoidance mechanism may be used in this situation. If PDSCH and/or EPDCCH are transmitted in a subframe that is semi-statically configured by RRC signaling as a cell-specific SRS subframe, the PDSCH/EPDCCH are rate-matched around the SRS symbol(s) in the subframe.

CSI Reporting

Problems similar to the SRS transmission issues may also arise for periodic CSI reporting. These problems can occur because the UE is semi-statically configured by RRC signaling with a periodic CSI reporting configuration. The UE may be configured with at least two subframe sets: one for reporting CSI of fixed subframes, and the other for reporting CSI of flexible subframes.

A CSI reference resource is a combination of a time domain and frequency domain resource where the CSI is measured. For a set of subframes that may be dynamically reconfigured to DL, the CSI reference resource is valid only if the CSI reference resource occurs in a DL subframe according to the currently active dynamically signaled UL/DL configuration. It is also possible to support a CSI reference resource contained in a special subframe according to the currently active dynamically signaled UL/DL configuration if the Special Subframe configuration contains at least four Orthogonal Frequency Division Multiplex (OFDM) symbols in the DwPTS region.

We now turn to the subframes where the CSI is transmitted from the UE to the base station. In a first scheme, the dynamically signaled TDD reconfiguration command contains CSI offset fields in the event that the subframe where the CSI is to be reported has been dynamically reconfigured as a DL subframe. The minimum information to be captured in the UL/DL reconfiguration command is a delta subframe offset that adjusts the CQI subframe offset $N_{OFFSET,CQI}$.

In a second scheme, the UE transmits CSI only in a subframe configured for UL transmissions in the dynamically signaled UL/DL configuration. Therefore, if an UL subframe according to the SIB1 UL/DL configuration is adaptively reconfigured to a DL subframe, and the UE is semi-statically configured to transmit a periodic CSI report in this same subframe, the UE does not transmit the periodic CSI report.

In a third scheme, when the UE is configured for fast adaptation of the TDD UL/DL configuration, then the UE does not transmit periodic CSI reports according to the semi-statically configured periodic CSI reporting configuration. The UE clears the periodic CSI reporting configuration including any configured PUCCH Format 2 resource. In an alternative embodiment, the UE disables the periodic CSI reporting configuration and re-activates the CSI reporting configuration if the network disables fast adaptation of the TDD UL/DL configuration.

The aperiodic CSI reporting configuration remains valid for this UE. For example, if a UE detects a PDCCH in subframe k of radio frame n containing a positive CSI request for subframe m in radio frame n+1, and if the TDD UL/DL configuration is changed for radio frame n+1 such that subframe m in radio frame n+1 is no longer an UL subframe, then the UE transmits the CSI report in the first UL subframe following subframe m in radio frame n+1.

Figure 4:
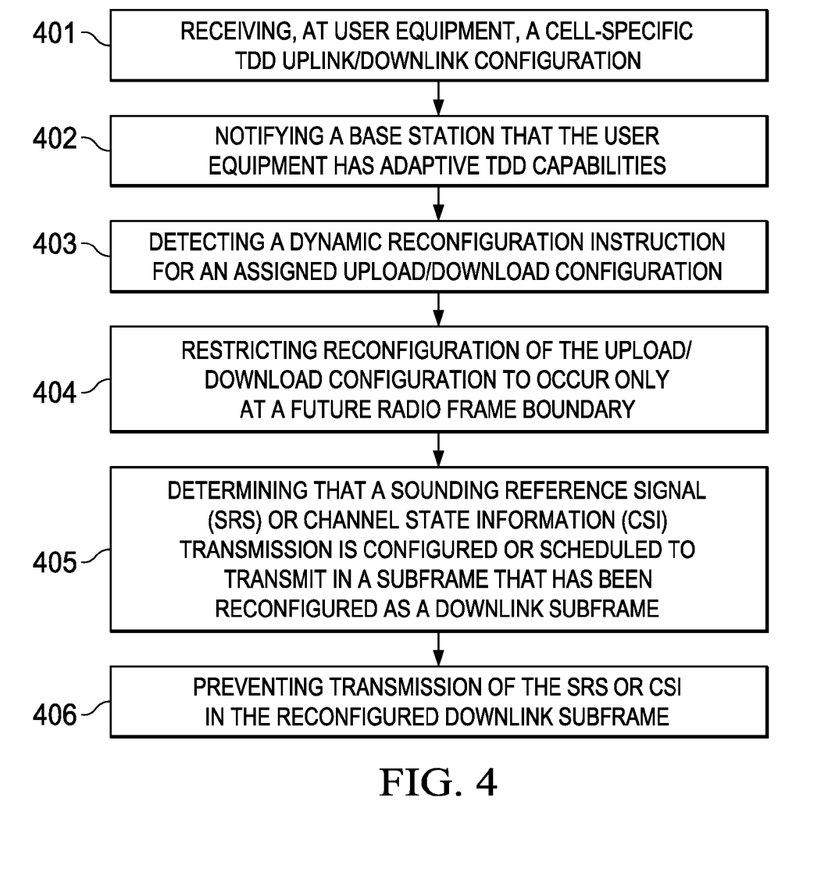
FIG. 4 is a flowchart illustrating dynamic reconfiguration of the UL/DL resource partitioning in a TDD wireless communication system.

FIG. 4 is a flowchart illustrating dynamic reconfiguration of the UL/DL configuration in a TDD wireless communication system. In step 401, a cell-specific TDD UL/DL configuration is received at a UE. In step 402, a UE notifies the base station that said UE has adaptive TDD capabilities. In step 403, the user equipment detects a dynamic reconfiguration instruction for an assigned TDD UL/DL configuration. In step 404, the UE restricts reconfiguration of the TDD UL/DL configuration at the UE to occur only at a specific future radio frame boundary.

In step 405, the UE determines that a SRS or CSI transmission is configured to transmit in a subframe that has been reconfigured by the dynamic reconfiguration instruction as a DL subframe. In step 406, the UE prevents the transmission of the SRS or CSI in the reconfigured DL subframe.

The UE may be configured to monitor one or more designated subframes for the dynamic reconfiguration instruction, wherein the designated subframes corresponding to DL subframes in all available UL/DL configurations for the TDD wireless communication system, such as subframes 0 and 5 in an LTE system.

A dynamic reconfiguration instruction received by the UE in subframe n may include an instruction to apply a new UL/DL configuration in a later subframe n+k, where k is an integer. The UE then applies the UL/DL reconfiguration in subframe n+k. Alternatively, the UE may apply the UL/DL reconfiguration after a change notification window. For example, the UE may detect a dynamic reconfiguration instruction during a current change notification window. The UE then applies the UL/DL reconfiguration at a next change notification window boundary.

The UE may receive a dynamic reconfiguration instruction in dynamic signaling from the base station. For example, the UE may monitor a DCI format carried in a PDCCH/EPDCCH from the base station. The UE determines whether the DCI schedules a PDSCH or indicates a UL/DL reconfiguration based upon a setting of a one-bit field in the DCI. When a UL/DL reconfiguration is indicated, the DCI format comprises a new UL/DL configuration, changes to SRS transmission, and CSI reporting configurations according to the new UL/DL configuration.

The dynamic reconfiguration instruction may contain an SRS and/or CSI delta offset field. The UE adjusts an SRS subframe offset based upon the delta offset field so that the SRS or CSI is sent on a valid UL subframe in a new TDD UL/DL configuration signaled in the dynamic reconfiguration instruction. The SRS delta offset field value may be selected by ignoring any subframes that are fixed as DL subframes in all available UL/DL configurations.

The UE may detect a PDCCH containing a request that schedules an SRS transmission in a designated subframe of a later radio frame. The UE determines that the designated subframe of the later radio frame is no longer a valid cell-specific SRS subframe due to a UL/DL reconfiguration. The UE may then transmit the SRS in a first valid cell-specific SRS subframe following the designated subframe in the later radio frame or in a first valid UE-specific aperiodic SRS subframe following the designated subframe in the later radio frame.

Figure 5:
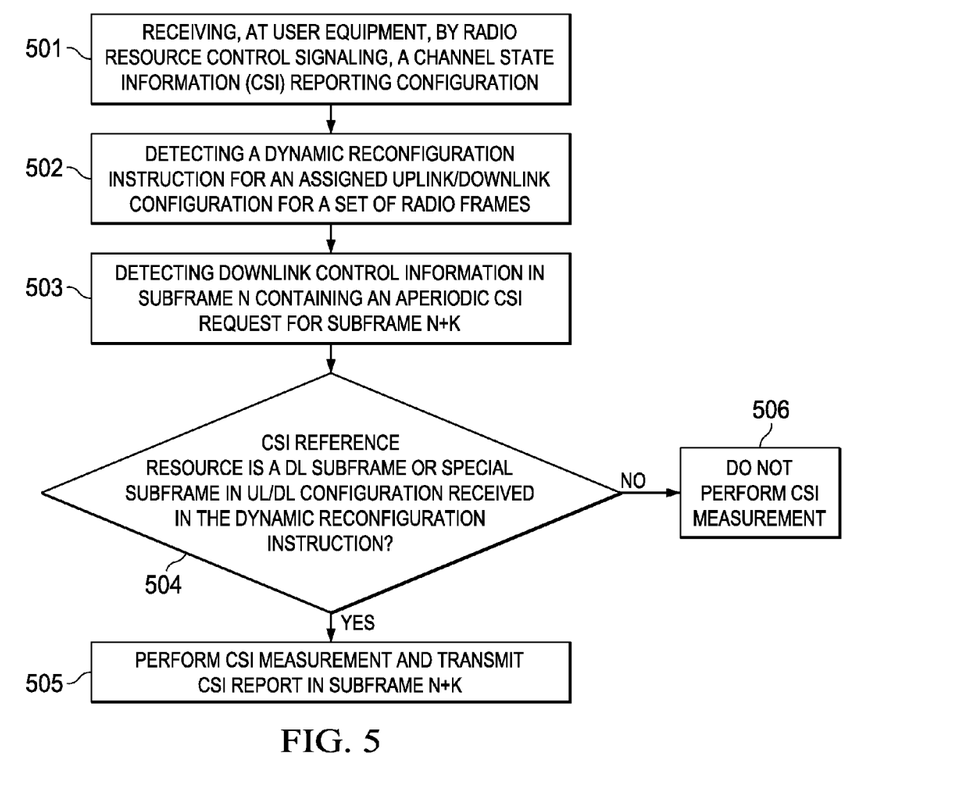
FIG. 5 is a flowchart illustrating a procedure for determining a valid CSI reference resource.

FIG. 5 is a flowchart illustrating a procedure for determining a valid CSI reference resource. In step 501, the UE receives a CSI reporting configuration by RRC signaling. In step 502, the UE detects a dynamic reconfiguration instruction for an assigned UL/DL configuration for a set of radio frames. In step 503, the UE detects downlink control information in subframe N containing an aperiodic CSI request for later subframe N+K.

In step 504, the UE determines whether the CSI reference resource is a DL subframe or special subframe in the UL/DL configuration that was received in the dynamic reconfiguration instruction. If the CSI reference resource is a DL subframe or special subframe, then the UE performs a CSI measurement in the reference resource and subsequently transmits a CSI report in subframe N+K in step 505. Otherwise, if the CSI reference is an UL subframe in the UL/DL configuration received in the dynamic reconfiguration instruction, then the UE does not perform a CSI measurement as indicated in step 506.

Figure 6:
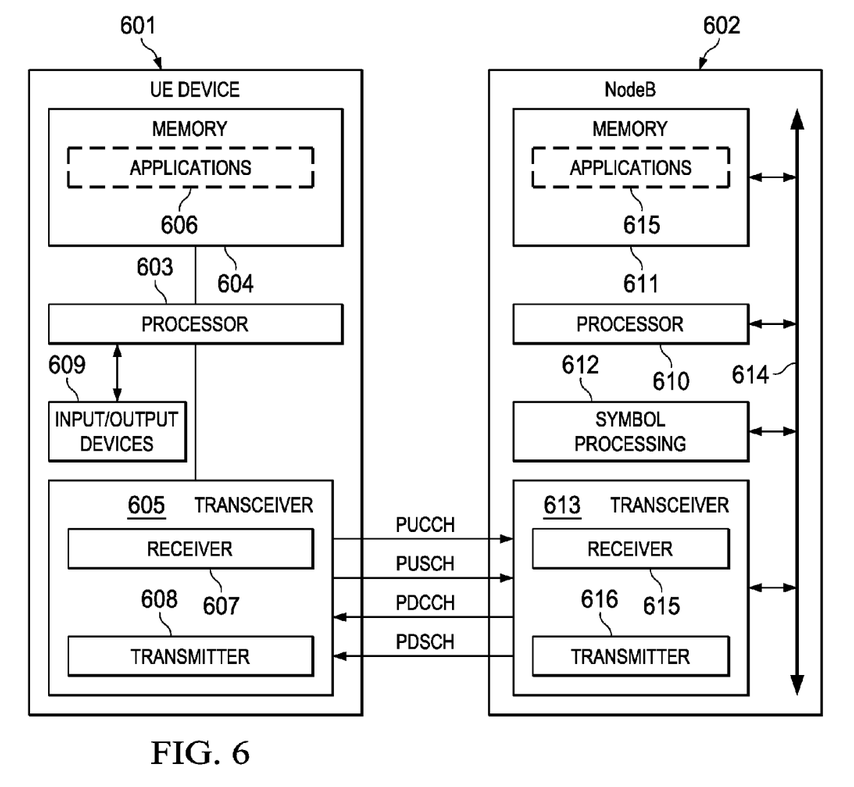
FIG. 6 is a block diagram illustrating internal details of a mobile UE and an eNB operating in a network system such as illustrated in FIG. 1.

FIG. 6 is a block diagram illustrating internal details of a mobile UE 601 and an eNB 602 operating in a network system such as illustrated in FIG. 1. Mobile UE 601 may represent any of a variety of devices such as a server, a desktop computer, a laptop computer, a cellular phone, a Personal Digital Assistant (PDA), a smart phone or other electronic devices. In some embodiments, the electronic mobile UE 601 communicates with eNB 602 based on a LTE or Evolved Universal Terrestrial Radio Access (E-UTRA) protocol. Alternatively, another communication protocol now known or later developed can be used.

Mobile UE 601 comprises a processor 603 coupled to a memory 604 and a transceiver 605. The memory 604 stores (software) applications 606 for execution by the processor 603. The applications could comprise any known or future application useful for individuals or organizations. These applications could be categorized as operating systems (OS), device drivers, databases, multimedia tools, presentation tools, Internet browsers, emailers, Voice-Over-Internet Protocol (VOIP) tools, file browsers, firewalls, instant messaging, finance tools, games, word processors or other categories. Regardless of the exact nature of the applications, at least some of the applications may direct the mobile UE 601 to transmit UL signals to eNB (base station) 602 periodically or continuously via the transceiver 605.

Transceiver 605 includes uplink logic which may be implemented by execution of instructions that control the operation of the transceiver. Some of these instructions may be stored in memory 604 and executed when needed by processor 603. As would be understood by one of skill in the art, the components of the uplink logic may involve the physical (PHY) layer and/or the Media Access Control (MAC) layer of the transceiver 605. Transceiver 605 includes one or more receivers 607 and one or more transmitters 608.

Processor 603 may send or receive data to various input/output devices 609. A subscriber identity module (SIM) card stores and retrieves information used for making calls via the cellular system. A Bluetooth baseband unit may be provided for wireless connection to a microphone and headset for sending and receiving voice data. Processor 603 may send information to a display unit for interaction with a user of mobile UE 601 during a call process. The display may also display pictures received from the network, from a local camera, or from other sources such as a Universal Serial Bus (USB) connector. Processor 603 may also send a video stream to the display that is received from various sources such as the cellular network via RF transceiver 605 or the camera.

During transmission and reception of voice data or other application data, transmitter 607 may be or become non-synchronized with its serving eNB. In this case, it sends a random access signal. As part of this procedure, it determines a preferred size for the next data transmission, referred to as a message, by using a power threshold value provided by the serving eNB, as described in more detail above. In this embodiment, the message preferred size determination is embodied by executing instructions stored in memory 604 by processor 603. In other embodiments, the message size determination may be embodied by a separate processor/memory unit, by a hardwired state machine, or by other types of control logic, for example.

eNB 602 comprises a processor 610 coupled to a memory 611, symbol processing circuitry 612, and a transceiver 613 via backplane bus 614. The memory stores applications 615 for execution by processor 610. The applications could comprise any known or future application useful for managing wireless communications. At least some of the applications 615 may direct eNB 602 to manage transmissions to or from mobile UE 601.

Transceiver 613 comprises an uplink resource manager, which enables eNB 602 to selectively allocate uplink Physical Uplink Shared CHannel (PUSCH) resources to mobile UE 601. As would be understood by one of skill in the art, the components of the uplink resource manager may involve the physical (PHY) layer and/or the Media Access Control (MAC) layer of the transceiver 613. Transceiver 613 includes at least one receiver 615 for receiving transmissions from various UEs within range of eNB 602 and at least one transmitter 616 for transmitting data and control information to the various UEs within range of eNB 602.

The uplink resource manager executes instructions that control the operation of transceiver 613. Some of these instructions may be located in memory 611 and executed when needed on processor 610. The resource manager controls the transmission resources allocated to each UE 601 served by eNB 602 and broadcasts control information via the PDCCH. UE 601 may receive TTD UL/DL configuration instructions from eNB 602.

Symbol processing circuitry 612 performs demodulation using known techniques. Random access signals are demodulated in symbol processing circuitry 612. During transmission and reception of voice data or other application data, receiver 615 may receive a random access signal from a UE 601. The random access signal is encoded to request a message size that is preferred by UE 601. UE 601 determines the preferred message size by using a message threshold provided by eNB 602.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method, comprising:
   receiving, at a user equipment (UE) in a time division duplex (TDD) wireless communication system, a cell-specific TDD uplink (UL)/downlink (DL) configuration for a plurality of radio frames;
   notifying a base station in the TDD wireless communication system that the UE has adaptive TDD capabilities;
   detecting, at the user equipment, a dynamic reconfiguration signal for an assigned TDD UL/DL configuration; and
   restricting activation of the signaled TDD UL/DL configuration at the UE to occur only at future radio frame boundaries.

2. The method of claim 1, further comprising:
   monitoring one or more designated subframes for the dynamic reconfiguration signal, the designated subframes corresponding to DL subframes that are common to all available UL/DL configurations for the TDD wireless communication system.

3. The method of claim 1, wherein a dynamic reconfiguration signal received in subframe n comprises an instruction to apply a new TDD UL/DL configuration in subframe n+k, where k is an integer.

4. The method of claim 1, further comprising:
   applying a UL/DL reconfiguration after a change notification window.

5. The method of claim 4, further comprising:
   detecting the dynamic reconfiguration signal during a current change notification window; and
   applying a UL/DL reconfiguration at a next change notification window boundary.

6. The method of claim 1, further comprising:
monitoring a Downlink Control Information (DCI) format carried in a Physical Downlink Control Channel (PDCCH)/Enhanced Physical Downlink Control Channel (EPDCCH) from the base station; and
determining, based upon a setting of a one-bit field in the DCI, whether the DCI schedules a Physical Downlink Shared Channel (PDSCH) or indicates a UL/DL reconfiguration.

7. The method of claim 6, wherein, when a UL/DL reconfiguration is indicated, the DCI format comprises a new UL/DL configuration, changes to Sounding Reference Signal (SRS) transmission, and Channel State Information (CSI) reporting configurations according to the new UL/DL configuration.

8. The method of claim 1, wherein the dynamic reconfiguration signal contains a Sounding Reference Signal (SRS) delta offset field, the method further comprising:
adjusting an SRS subframe offset based upon the delta offset field so that the SRS is sounded on a valid UL subframe in a new TDD UL/DL configuration signaled in the dynamic reconfiguration instruction.

9. The method of claim 8, wherein the SRS delta offset field value is selected by ignoring any subframes that are fixed as DL subframes in all available UL/DL configurations.

10. The method of claim 1, further comprising:
determining that a Sounding Reference Signal (SRS) transmission is configured to transmit in a subframe that has been reconfigured by the dynamic reconfiguration instruction as a DL subframe; and
preventing the transmission of the SRS in the reconfigured DL subframe.

11. The method of claim 1, further comprising:
detecting a Physical Downlink Control Channel (PDCCH) containing a request that schedules a Sounding Reference Signal (SRS) transmission in a designated subframe of a later radio frame;
determining that the designated subframe of the later radio frame is no longer a valid cell-specific SRS subframe due to a UL/DL reconfiguration; and
transmitting the SRS in a first valid cell-specific SRS subframe following the designated subframe in the later radio frame.

12. The method of claim 1, further comprising:
detecting a Physical Downlink Control Channel (PDCCH) containing a request that schedules a Sounding Reference Signal (SRS) transmission in a designated subframe of a later radio frame;
determining that the designated subframe of the later radio frame is no longer a valid cell-specific SRS subframe due to a UL/DL reconfiguration; and
transmitting the SRS in a first valid UE-specific aperiodic SRS subframe following the designated subframe in the later radio frame.

13. The method of claim 1, wherein the dynamic reconfiguration instruction contains a Channel State Information (CSI) delta offset field.

14. The method of claim 1, further comprising:
determining that a Channel State Information reference resource is valid only if the resource occurs in a subframe indicated as downlink by the currently active dynamically signaled UL/DL configuration.

15. The method of claim 1, further comprising:
determining that a Channel State Information reference resource is valid only if the resource occurs in a subframe indicated as a special subframe by the currently active dynamically signaled UL/DL configuration; and
if the Special Subframe configuration contains at least 4 OFDM symbols in the downlink portion of the special subframe.

16. The method of claim 1, further comprising:
determining that a Channel State Information (CSI) transmission is configured to transmit in a subframe that has been reconfigured by the dynamic reconfiguration instruction as a DL subframe; and
preventing the transmission of the CSI in the reconfigured DL subframe.

17. A user equipment device, comprising:
a processor circuit configured to:
receive a cell-specific time division duplex (TDD) uplink (UL)/downlink (DL) configuration for a plurality of subframes within a radio frame;
detect a dynamic reconfiguration signal for an assigned TDD UL/DL configuration; and
restrict reconfiguration of a TDD UL/DL configuration to occur only at future radio frame boundaries.

18. The user equipment device of claim 17, wherein the processor is configured to:
apply a new TDD UL/DL configuration in a subframe n+k, where k is an integer, following instructions received in a dynamic reconfiguration signal received in subframe n.

19. The user equipment device of claim 17, wherein the processor is configured to:
apply a UL/DL reconfiguration after a change notification window.

20. The user equipment device of claim 17, wherein the processor is configured to:
prepare to adapt its UL/DL configuration based on a dynamic reconfiguration signal received in downlink control information from a base station;
monitor a Downlink Control Information (DCI) format carried in a Physical Downlink Control Channel (PDCCH)/Enhanced Physical Downlink Control Channel (EPDCCH) from the base station; and
determine, based upon a setting of a one-bit field in the DCI, whether the DCI schedules a Physical Downlink Shared Channel (PDSCH) or indicates a UL/DL reconfiguration,
wherein, when a UL/DL reconfiguration is indicated, the DCI format comprises a new UL/DL configuration, changes to Sounding Reference Signal (SRS) transmission, and Channel State Information (CSI) reporting configurations according to the new UL/DL configuration.

21. The user equipment device of claim 17, wherein the dynamic reconfiguration instruction contains a Sounding Reference Signal (SRS) delta offset field or a Channel State Information (CSI) delta offset field, the method further comprising:
adjusting an SRS subframe offset based upon the delta offset field so that the SRS or CSI is sounded on a valid UL subframe in a new TDD UL/DL configuration signaled in the dynamic reconfiguration instruction.

22. The user equipment device of claim 17, wherein the processor is configured to:
- determine that a Sounding Reference Signal (SRS) or Channel State Information (CSI) transmission is configured to transmit in a subframe that has been reconfigured by the dynamic reconfiguration instruction as a DL subframe; and
- prevent the transmission of the SRS or CSI in the reconfigured DL subframe.

* * * * *